(12) United States Patent
Konzelmann et al.

(10) Patent No.: US 7,380,470 B2
(45) Date of Patent: Jun. 3, 2008

(54) ULTRASONIC FLOW METER INCLUDING TURBULATORS

(75) Inventors: Uwe Konzelmann, Asperg (DE); Tobias Lang, Stuttgart (DE); Christoph Gmelin, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/304,906

(22) Filed: Dec. 14, 2005

(65) Prior Publication Data
US 2006/0156829 A1 Jul. 20, 2006

(30) Foreign Application Priority Data
Dec. 14, 2004 (DE) ............... 10 2004 060 064

(51) Int. Cl.
*G01F 1/66* (2006.01)
(52) U.S. Cl. ............... 73/861.28; 73/861.29; 73/861.25
(58) Field of Classification Search ............ 73/861.25, 73/861.28, 861.29
See application file for complete search history.

(56) References Cited

U.S. PATENT DOCUMENTS

| | | | |
|---|---|---|---|
| 3,680,375 A | | 8/1972 | Joy et al. |
| 3,906,791 A | * | 9/1975 | Lynnworth ............... 73/861.29 |
| 4,257,275 A | * | 3/1981 | Kurita et al. ............ 73/861.06 |
| 4,336,719 A | * | 6/1982 | Lynnworth ............... 73/861.27 |
| 4,418,578 A | * | 12/1983 | Blechinger .............. 73/861.22 |
| 5,005,427 A | * | 4/1991 | Ohmae .................... 73/861.22 |
| 5,205,153 A | * | 4/1993 | Hlavinka et al. ......... 73/19.03 |
| 6,487,916 B1 | * | 12/2002 | Gomm et al. ............ 73/861.29 |
| 6,647,806 B1 | * | 11/2003 | Estrada et al. .......... 73/861.28 |
| 7,252,015 B2 | * | 8/2007 | Konzelmann et al. ... 73/861.25 |

FOREIGN PATENT DOCUMENTS

| | | |
|---|---|---|
| EP | 0 477 418 | 4/1996 |
| GB | 1 541 419 | 2/1979 |
| GB | 2 101 318 | 1/1983 |
| JP | 59100820 | 6/1984 |

* cited by examiner

*Primary Examiner*—Harshad Patel
(74) *Attorney, Agent, or Firm*—Kenyon & Kenyon LLP

(57) ABSTRACT

Measuring volume flows or mass flows in the intake system of motor vehicle internal combustion engines plays an important role in reducing harmful emissions. Therefore, an ultrasonic flow meter for measuring a flow velocity of a fluid flowing in an essentially laminar flow in the main flow direction is described. The ultrasonic flow meter has at least two ultrasonic transducers, the ultrasonic transducers being able to emit and/or receive ultrasonic waves at an angle α to the main flow direction which is different from 90°. Furthermore, the ultrasonic flow meter has at least one turbulator situated upstream from at least one ultrasonic transducer in the main flow direction of the fluid, which generates longitudinal eddies in at least one zone adjacent to the at least one ultrasonic transducer, in particular in a protrusion in a wall of a flow pipe and thus improves the flow of the fluid in this zone in the flow pipe. Wedge-shaped turbulators protruding into the flow of the fluid or flow grooves are provided in particular as turbulators. The ultrasonic flow meter is distinguished, in comparison with devices known from the related art, by improved signal-to-noise ratio and thus by higher measurement accuracy.

10 Claims, 6 Drawing Sheets

PRIOR ART

ULTRASONIC FLOW METER INCLUDING TURBULATORS

FIELD OF THE INVENTION

Ultrasonic flow meters are used in the automotive industry, in particular in the intake system of internal combustion engines, for measuring volume flow or mass flow.

BACKGROUND INFORMATION

Typically ultrasonic transducers are used which are capable of both emitting ultrasonic waves into a fluid and receiving ultrasonic waves. The propagation time of ultrasonic signals which are transmitted from an emitter to a receiver is influenced by the flow of the fluid. It is possible to infer the flow velocity of the fluid from the degree of influence of the propagation time.

British Published Patent Application No. 2 101 318 describes an ultrasonic flow meter in which two ultrasonic transducers are mounted on opposite sides of a pipe through which a fluid flows. The transducers are situated slightly offset with respect to one another, so that ultrasonic waves emitted by one transducer and received by the second transducer propagate at an angle to the flow direction of the fluid which is different from 90°.

In addition to the system described in British Published Patent Application No. 2 101 318 A, ultrasonic flow meters are also known in which ultrasonic waves emitted by an ultrasonic transducer are initially reflected one time or multiple times before they are received by a second ultrasonic transducer situated on the same side of the pipe through which the fluid flows as the first ultrasonic transducer. Such systems are described, for example, in European Published Patent Application No. 0 477 418, in British Published Patent Application No. 1 541 419 and in Japanese Published Patent Application No. 59100820. In European Published Patent Application No. 0 477 418 A1, a unit made up of two ultrasonic transducers and one reflector system is integrated into a coherent unit which may be installed in a measuring tube.

FIG. 1 shows the operating principle of these measuring systems corresponding to the related art. A fluid 112, for example, air, flows through a flow pipe 110 in an essentially laminar flow at a flow velocity $v_{FL}$ 114. Two ultrasonic transducers 116 and 118 are mounted on opposite sides of flow pipe 110 in such a way that first ultrasonic transducer 116 is able to emit ultrasonic waves, which may be received by second ultrasonic transducer 118, these ultrasonic waves propagating at a velocity $v_{UL}$ 120 at an angle α to flow velocity 114 which is different from 90°. In the system depicted here, the ultrasonic waves of ultrasonic transducer 116 propagate toward ultrasonic transducer 118 at a velocity $v_{UL,1}$ which is higher than in an unmoving fluid 112 due to the motion of fluid 112 at velocity 114.

$$v_{UL,1} = v_{UL} + vFL \cdot \cos \alpha \qquad (1)$$

$v_{UL}$ stands for the propagation velocity of the ultrasonic waves in an unmoving fluid. In contrast, if ultrasonic waves are emitted by ultrasonic transducer 118 and received by ultrasonic transducer 116, these waves propagate at a velocity $v_{UL,2}$ which is lower than propagation velocity $v_{UL}$ in unmoving fluid 112.

$$v_{UL,2} = v_{UL} - v_{FL} \cdot \cos a \qquad (2)$$

Comparing a propagation time $t_1$ which a signal needs from ultrasonic transducer 116 to ultrasonic transducer 118 with a propagation time $t_2$ which an ultrasonic signal needs from ultrasonic transducer 118 to ultrasonic transducer 116 allows flow velocity $v_{FL}$ 114 of the fluid to be determined:

$$v_{FL} = \frac{L}{2 \cdot \cos \alpha} \cdot \left( \frac{1}{t_1} - \frac{1}{t_2} \right) \qquad (3)$$

A similar calculation of flow velocity $v_{FL}$ may also be performed for reflection systems such as described in EP 0 477 418 A1, for example.

The systems described in the related art, however, all have the problem that angle α in FIG. 1 must be sufficiently small for a successful flow measurement, but at least substantially smaller than 90°. This results in the problem that it is not possible to fit the surfaces of ultrasonic transducers 116, 118 flush to the inside surface of flow pipe 110. Protrusions 122 are thus formed in flow pipe 110 in the area of ultrasonic transducers 116, 118, which result in turbulences and flow separations. These turbulences cause pressure fluctuations and may result in interfering signal contributions which are superimposed on the actual ultrasonic signals as noise.

Another disadvantage of these turbulences and flow separations is that contaminants or particles such as dust, oil, or water droplets contained in the flowing medium tend to be deposited in the turbulence zones. One possible remedy is to insert wedge-shaped adaptor elements which fill up protrusions 122 of flow pipe 110 but are permeable to ultrasonic waves. The disadvantage here, however, is that the layer thickness of the wedge-shaped adapter elements varies over the cross section of an emitted ultrasound beam. This makes resonance adjustment for efficient ultrasound injection into the flowing medium difficult. Furthermore, such a construction responds sensitively to structure-borne noise injected into flow pipe 110.

SUMMARY OF THE INVENTION

The present invention therefore provides an ultrasonic flow meter for measuring the volume flow and/or the mass flow of a fluid which may be used in particular in the intake system of a motor vehicle internal combustion engine.

The present invention is based on an ultrasonic flow meter corresponding to the related art for measuring a flow velocity of a fluid exhibiting an essentially laminar flow in a main flow direction. At least two ultrasonic transducers are used, it being possible for the ultrasonic transducers to emit ultrasonic waves into the flowing fluid at an angle to the primary flow direction which is different from 90° or receive ultrasonic waves. The core of the present invention is that at least one turbulator is situated upstream from at least one of the ultrasonic transducers in the main flow direction. This turbulator generates turbulences in at least one zone of the fluid adjacent to the at least one ultrasonic transducer.

These turbulators may be flow grooves, wedges, and/or steps for example, or a combination of these elements. These elements are advantageously interrupted once or multiple times across the main flow direction.

The use of turbulators according to the present invention in the vicinity of the ultrasonic transducers causes the formation of eddies which reduce or stabilize burble zones in the design-related pipe protrusions near the ultrasonic transducers. By locally generating turbulences, the flow adjusts better overall to the contours of the ultrasonic flow meter, thus reducing aerodynamically caused interference signals. The flow meter signal thus becomes considerably more accurate. This effect may be additionally reinforced by suitably shaping the protrusions, in particular by forming rounded edges on the protrusions.

The present invention may be applied to both linear systems such as described, for example, in British Published Patent Application No. 2 101 318 and reflection systems such as presented in European Published Patent Application No. 0 477 418. Complete or partial integration of the system into an insertion sensor which is insertable into a flow pipe is possible and facilitates practical insertability and replaceability of the ultrasonic flow meter. In particular, an electronic control device may also be integrated into the insertion sensor for activating and/or reading at least one ultrasonic transducer. The electronic control unit for reading out at least one ultrasonic transducer may, for example, contain electronics for preprocessing received signals. Appropriate electronic plug-and-socket connections may also be integrated for contacting the insertion sensor. Furthermore, at least one reflection element having a reflection surface may be integrated into the insertion sensor, making it possible to implement, for example, one of the reflection systems described above. Advantageously, the at least one reflection element is inserted into the flow pipe in such a way that fluid is able to flow on both sides of the reflection surface along the reflection body. This has the advantage in particular that if the reflection element is not in contact with the wall of the flow pipe, water droplets that may be contained in the flow are precipitated on the flow pipe as a wall film before flowing through the insertion sensor, the wall film then being able to flow through the flow pipe without wetting or contaminating the reflection surface and thus interfering with the reflection.

DETAILED DESCRIPTION

Figure 1:
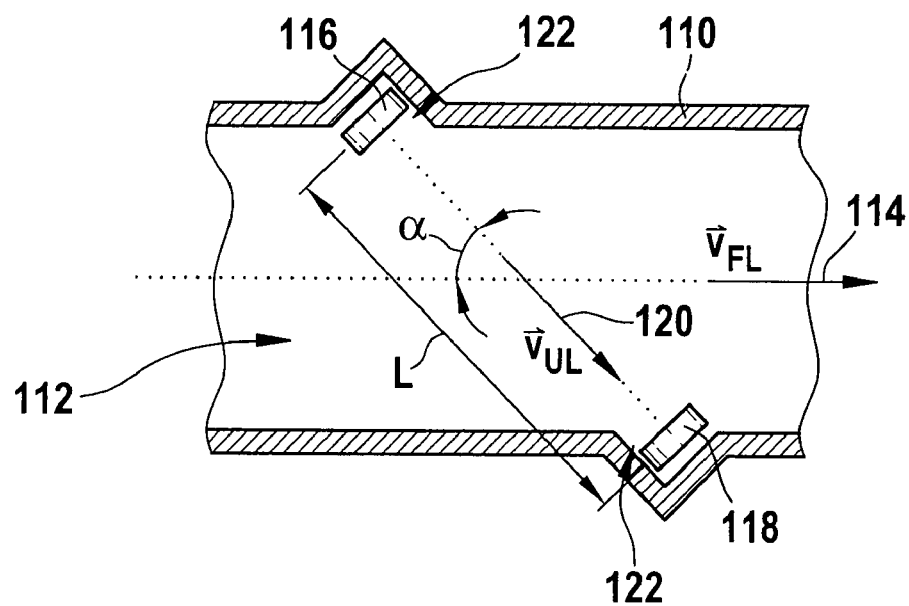
FIG. 1 shows a schematic diagram of a system for ultrasonic flow measuring;.
Figure 2:
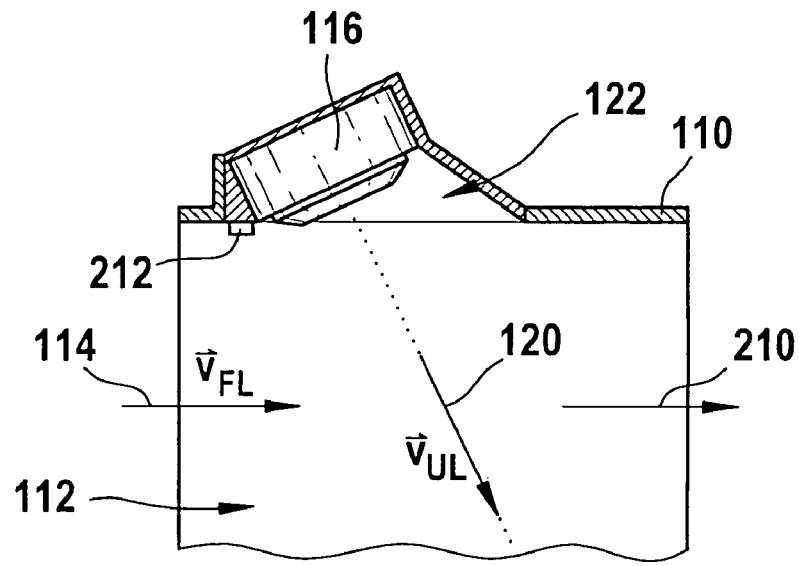
FIG. 2 shows a cutaway diagram of a part of an embodiment of a system for ultrasonic flow measuring, the section plane being parallel to the main flow direction.
Figure 3:
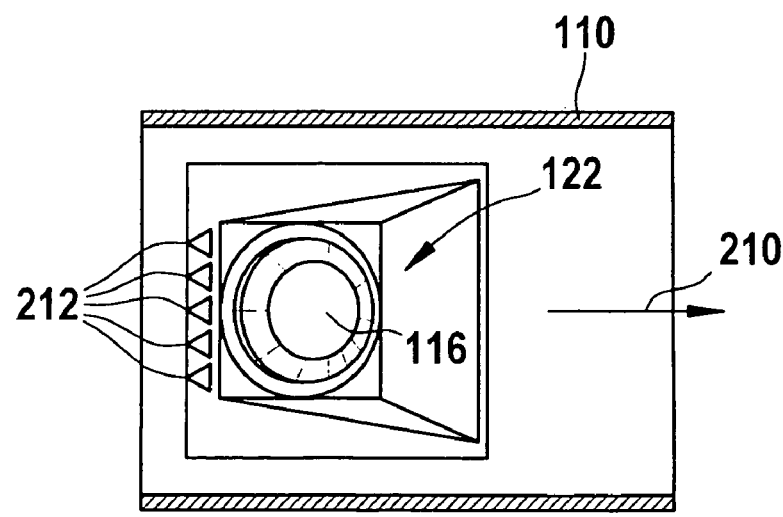
FIG. 3 shows a view of the system according to FIG. 2 from below.

The principle of ultrasonic flow measuring has been explained above with reference to FIG. 1. Linear systems (as in FIG. 1) or reflection systems may be used, for example. FIGS. 2 through 3 show a detail of an embodiment according to the present invention of an ultrasonic flow meter. The detail includes only an area around an ultrasound sensor 116, which is embedded into a wall of a flow pipe 110. A fluid 112 having a main flow direction 210, which is parallel to flow velocity 114, flows through flow pipe 110. As explained previously with reference to FIG. 1, a protrusion 122 is formed upstream from ultrasound sensor 116, within which burble zones of the flow of fluid 112 are formed.

As the cutaway view having the section plane parallel to main flow direction 210 in FIG. 2 and the view from below according to FIG. 3 show, in this embodiment of the present invention, turbulators 212 are situated upstream from protrusion 122 on the wall of flow pipe 110. In this case, turbulators 212 have five flat leaves having a wedge-shaped cross section, which are equidistant from one another on the wall of flow pipe 110 and protrude into the flow of fluid 112. The tip of the wedge-shaped cross section faces away from ultrasonic transducer 116, while the wider side of each turbulator 212 faces ultrasonic transducer 116.

Figure 4:
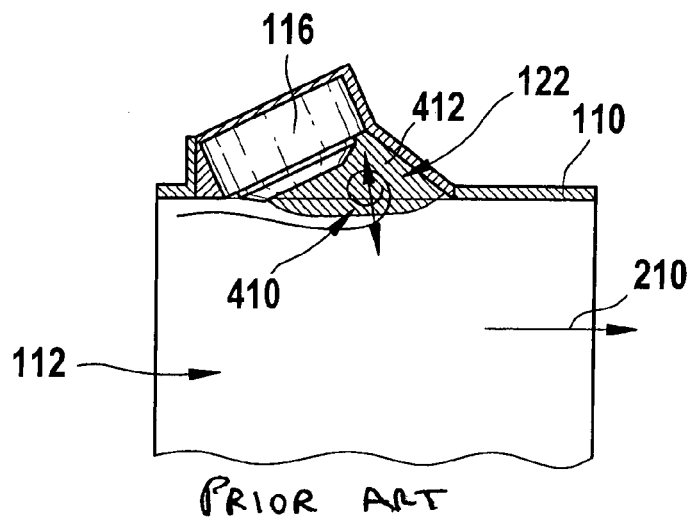
FIG. 4 shows a system similar to that according to FIG. 2, corresponding to the related art without turbulators.
Figure 5:
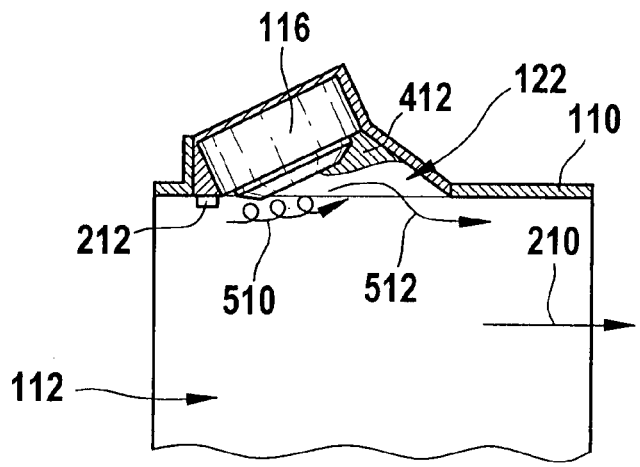
FIG. 5 shows the formation of eddies in the system according to FIGS. 2 and 3 in side view.
Figure 6:
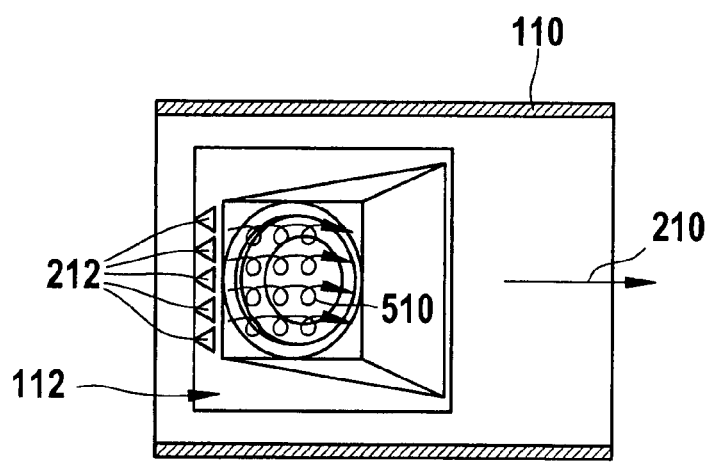
FIG. 6 shows the formation of eddies according to FIG. 5 from below.

The functioning of turbulators 212 is elucidated with reference to FIGS. 4 through 6. FIG. 5 corresponds to FIG. 2 and FIG. 6 corresponds to FIG. 3. FIG. 4 shows a cutaway view similar to FIG. 5, having the section plane parallel to main flow direction 210; however, no turbulators 212 are used, according to the related art.

As FIG. 4 shows, in an embodiment without turbulators 212, relatively large eddy zones 410 are formed in the area of protrusion 122 of flow pipe 110, the eddy zones in turn resulting in large burble zones 412 of the flow of fluid 112 in the area of protrusions 122. These burble zones 412 may be extremely unstable, constantly changing their extension across main flow direction 210. This results in intense local pressure fluctuations, which are detected by ultrasonic transducer 116 as interfering signal background.

On the other hand, when turbulators 212 are used as shown in FIGS. 5 and 6, longitudinal eddies 510 are formed due to the discontinuities across main flow direction 210, caused by turbulators 212. These longitudinal eddies 510 cause a more intense pulse exchange between burble zone 412 and the remaining flow of fluid 112, which considerably reduces burble zone 412 in the exemplary embodiment according to FIGS. 5 and 6. Furthermore, the extension of burble zone 412 across main flow direction 210 is stabilized, so that the interfering signal background due to local pressure fluctuations upstream from ultrasonic transducer 116 is reduced. At the same time, the flow (symbolically represented by flow line 512 in FIG. 5) adheres better to the wall of flow pipe 110 and the wall of protrusion 122. The amplitude of pressure fluctuations upstream from ultrasonic transducer 116 and the associated interference signals are thus considerably reduced and the signal-to-noise ratio of the ultrasonic flow measuring is substantially improved.

In FIGS. 2, 3, 5, and 6, turbulators 212 have a wedged shaped design (i.e., flat leaves having a wedge-shaped cross section). However, other designs of turbulators 212 are also conceivable. Thus, for example, rectangular, quadrangular, or rounded cross-section geometries of turbulators 212 may also be used. Furthermore, instead of flat leaves, non-flat geometries may also be used (e.g., pyramids or similar three-dimensional formations). It is advantageous, however, if turbulators 212, as in the exemplary embodiment of FIGS.

2, 3, 5, and 6, have a possibly periodic structure perpendicular to main flow direction 210 of fluid 112. This preferably produces stable longitudinal eddies 510. In addition, alternatively or additionally, parts of turbulators 212 may also be designed as lamellas or guide vanes or guide blades in main flow direction 210.

Figure 7:
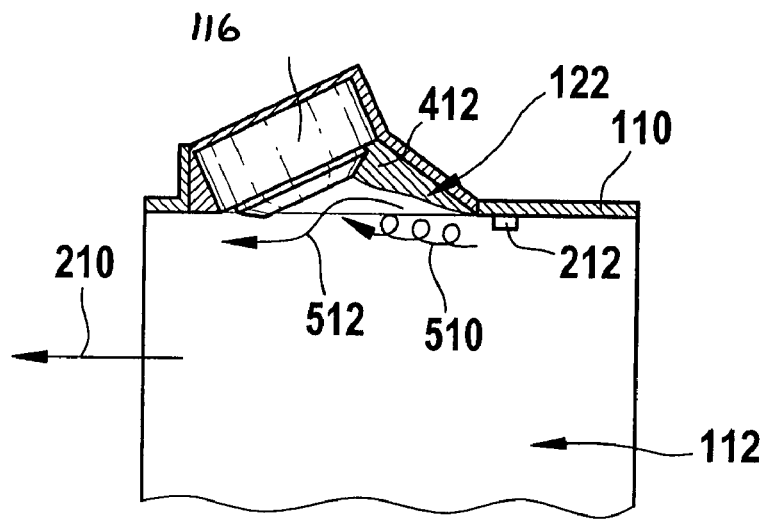
FIG. 7 shows a cutaway diagram of an exemplary embodiment alternative to the system according to FIG. 2, having turbulators situated differently and reversed main flow direction, the section plane being parallel to the main flow direction.
Figure 8:
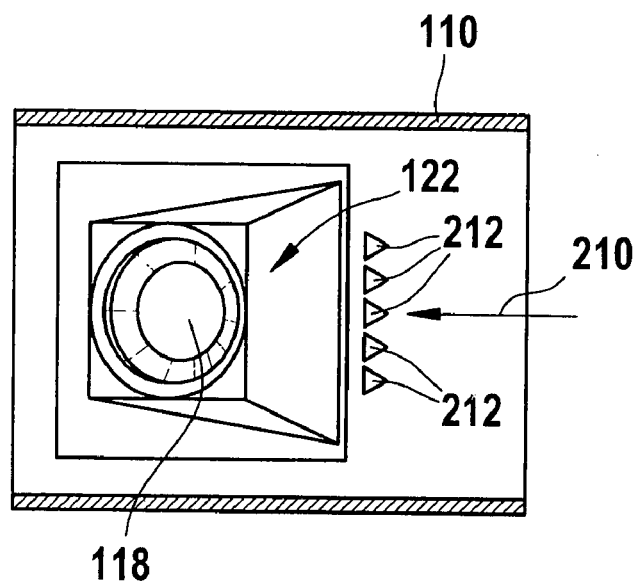
FIG. 8 shows a view of the system according to FIG. 7 from below.

FIGS. 7 and 8 show, respectively, a cutaway view having a section plane parallel to main flow direction 210 and a view from below of another embodiment of a part of an ultrasonic flow meter according to the present invention. In principle, the system of FIGS. 7 and 8 corresponds to the system of FIG. 5, for example; however, in this case fluid 112 flows through the system in the opposite direction, so that main flow direction 210 is from the right to the left in this exemplary embodiment. Thus, this detail corresponds, for example, to a detail around ultrasound sensor 118 in FIG. 1. Therefore, compared to the exemplary embodiment of FIG. 5, for example, in this exemplary embodiment a plurality of turbulators 212 are mounted on the opposite side of ultrasound sensor 118 on the wall of flow pipe 110. Also in this case, turbulators 212 have a wedge-shaped design, are situated periodically, and their tips point against main flow direction 210. Like in the above-mentioned exemplary embodiment, other embodiments of turbulators 212 are again conceivable.

The functioning of turbulators 212 is similar to the functioning according to the above-mentioned exemplary embodiment. Longitudinal eddies 510 are formed again, which reduce burble zone 412 within protrusion 122 upstream from ultrasonic transducer 118. Furthermore, the flow of fluid 112, again symbolized by flow line 512 in FIG. 7, adheres better to the wall of flow pipe 110 and protrusion 122.

In an ultrasonic flow meter, both systems according to the exemplary embodiment shown in FIGS. 2, 3, 5, and 6 and systems according to the exemplary embodiment of FIGS. 7 and 8 may be used. It may thus be advantageous to situate turbulators 212 upstream and downstream in main flow direction 210 from a protrusion 122 of an ultrasonic transducer 118. In this way, a response to the reversal of main flow direction 210, for example, is also possible, whereby mass flows and volume flows, for example, of refluxes of an internal combustion engine may be measured using the same system.

Figure 9:
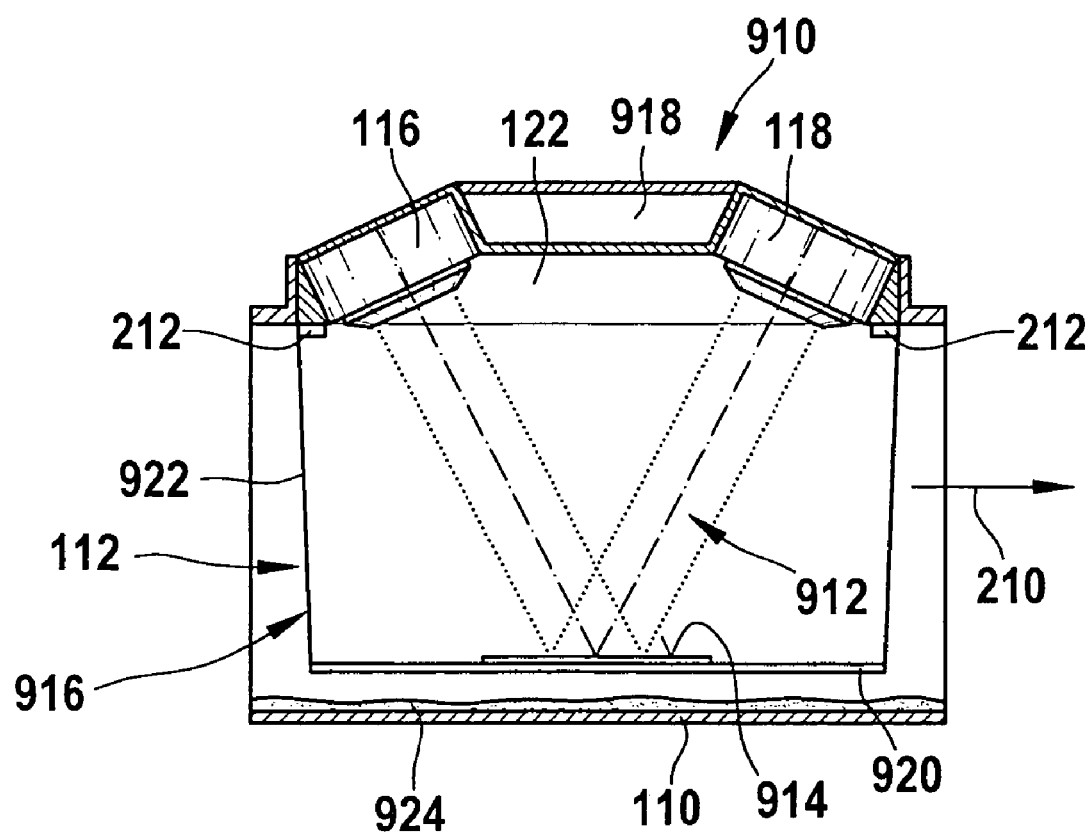
FIG. 9 shows a cutaway diagram of an embodiment of an ultrasonic flow meter equipped with turbulators and integrated into an insertion sensor, the section plane being parallel to the main flow direction.

FIG. 9 shows a preferred exemplary embodiment of an ultrasonic flow meter 910. Instead of a diagonal measuring system, as in FIG. 1 for example, a reflection system is used here. Ultrasonic waves 912 are exchanged between two ultrasonic transducers 116 and 118 and reflected on a reflection surface 914 in this example. Generalizing this principle, a plurality of reflection surfaces 914 and, accordingly, multiple reflections, may also be used.

In the case of a reflection system of this type, protrusions 122 upstream from ultrasonic transducers 116 and 118 are also formed. In the exemplary embodiment depicted in FIG. 9, these protrusions 122 are fused into a single protrusion. Also in this example, turbulators 212 may be advantageously used.

In the exemplary embodiment of FIG. 9, the components of ultrasonic flow meter 910 are integrated into an insertion sensor 916. Insertion sensor 916 includes the two ultrasonic transducers 116 and 118, a space 918 between these ultrasonic transducers 116, 118, and a reflection element 920, which is provided with reflection surface 914. Space 918 may be used, for example, for integrating an electronic terminal device and/or an electronic control device of ultrasonic flow meter 910. The electronic terminal device and the electronic control device thus become components of insertion sensor 916. The signals of ultrasonic flow meter 910 may thus be processed entirely or partially, for example, in insertion sensor 916.

Furthermore, insertion sensor 916 has a bracket 922, which connects and holds the individual components in alignment. In this exemplary embodiment, turbulators 212 are also secured by bracket 922 of insertion sensor 916 and thus form an integral component of insertion sensor 916.

Reflection element 920 is situated in flow pipe 110 at a distance from the wall of flow pipe 110, so that fluid 112 may flow around it on both sides. This distance between flow pipe 110 and reflection element 920 allows any water droplets or other contaminants contained in the flow to deposit on the wall of flow pipe 110 as wall film 924 prior to flowing through ultrasonic flow meter 910. This wall film 924, i.e., the liquid contained therein, may flow through flow pipe 110 without wetting reflection surface 914 or interfering with the reflection of ultrasonic waves 912. The above-described device having insertion sensor 916 also has considerable advantages over conventional devices regarding its susceptibility to interference by liquids and contaminants.

Bracket 922 of insertion sensor 916 may be designed in particular in such a way that it offers minimum flow resistance to the flow of fluid 112. Furthermore, bracket 922 may be designed in such a way that reflection element 920, together with bracket 922, forms a trough-shaped unit. This unit may, for example, have a plurality of additional openings through which fluid 112 outside of insertion sensor 916 is connected to fluid 112 within insertion sensor 916. Reflection element 920 may have a flat or even a curved design, for example, to focus ultrasonic waves 912.

As in the above-named exemplary embodiments, alternative types of turbulators 212 may also be used in the exemplary embodiment of FIG. 9. Additional turbulators 212 may also be installed at different points of insertion sensor 916, for example (e.g., via an additional bracket) between ultrasonic transducers 116 and 118.

Figure 10:
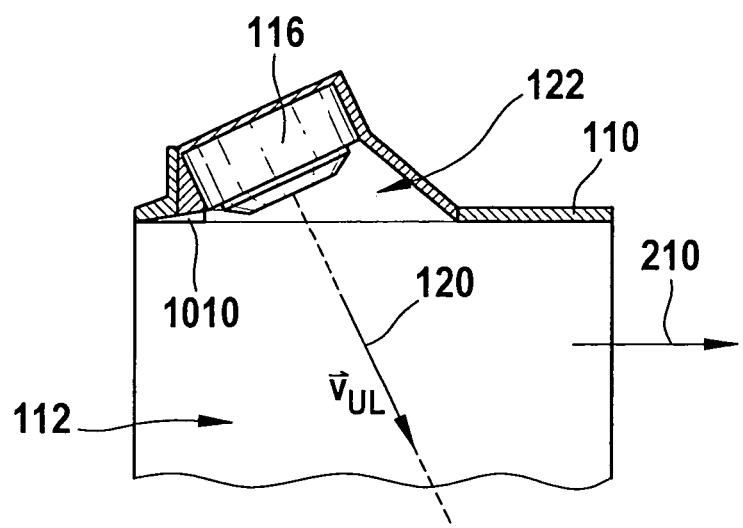
FIG. 10 shows a cutaway diagram of a part of an embodiment of an ultrasonic flow meter alternative to FIG. 2 having flow grooves, the section plane being parallel to the main flow direction.
Figure 11:
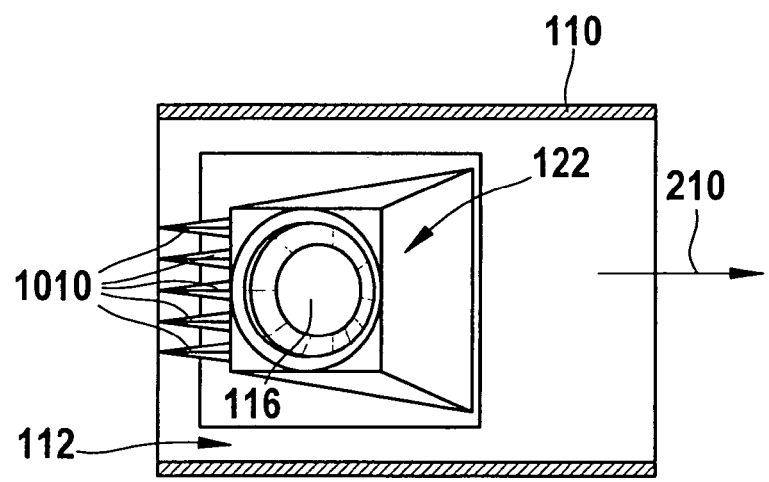
FIG. 11 shows a view of the system according to FIG. 10 from below.
Figure 12:
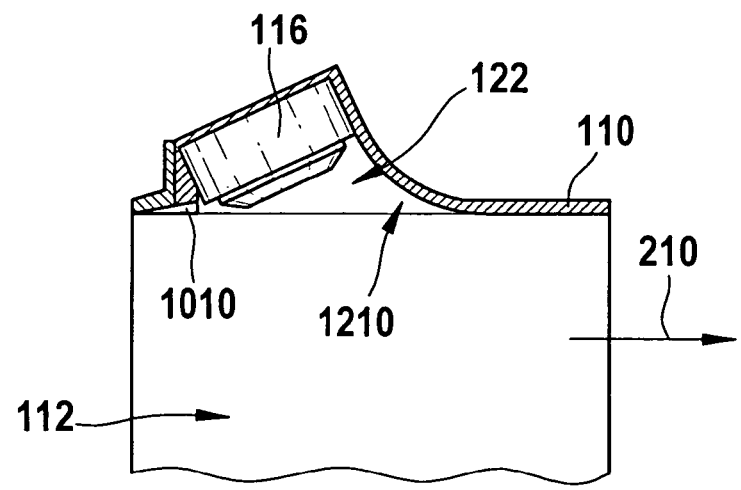
FIG. 12 shows an embodiment alternative to FIG. 10 having a rounded edge.

Instead of turbulators 212 used in the above-described exemplary embodiments, which protrude into the flow of fluid 112, flow grooves, for example, may also be used in main flow direction 210 of fluid 112. Exemplary embodiments of this type are illustrated in FIGS. 10, 11, and 12. FIGS. 10 and 12 again show cutaway views of an area of the exemplary embodiments having section planes parallel to main flow direction 210. In contrast, FIG. 11 shows a view from below of the area illustrated in FIG. 10.

In these exemplary embodiments, flow grooves 1010 are embedded into the wall of flow pipe 110 upstream from ultrasonic transducers 116 in main flow direction 210. These flow grooves 1010 are depressions in the wall of flow pipe 110 and have a wedge-shaped design both in the plane of the drawing according to FIGS. 10 and 12 and perpendicularly thereto in the plane of the drawing according to FIG. 11. These flow grooves 1010 are again situated periodically perpendicular to main flow direction 210 of fluid 112, the tips of wedge-shaped flow grooves 1010 pointing against main flow direction 210. As in the above-mentioned exemplary embodiments, the periodic arrangement of flow grooves 1010 causes longitudinal eddies 510 to form in protrusion 122 upstream from ultrasonic transducer 116 (see, for example, FIG. 5). As in the above-described exemplary embodiments, the measuring accuracy is thus substantially improved once again.

Alternative designs of flow grooves are also possible, for example flow grooves having rounded walls, as long as these flow grooves also have the effect of forming longitudinal eddies. A combination of flow grooves with turbulators 212 protruding into the flow of fluid 112, for example, according to one of the above-described exemplary embodiments, is also conceivable.

Furthermore, as shown in the exemplary embodiment according to FIG. 12, the combination of flow grooves 1010 (and also turbulators 212 protruding into the flow) with specially designed protrusions 122 is also possible. In this exemplary embodiment, the wall of flow pipe 110 has a rounded edge 1210 in the area of protrusion 122. This rounded edge 1210 causes a more even flow in the area of protrusion 122 and thus further improvement of the measuring accuracy of ultrasonic flow meter 910. Other designs of the wall shape of flow pipe 110 in the area of protrusions 122 are also conceivable, for example, an extension of protrusion 122 beyond ultrasonic transducer 116. It is, however, advantageous if at least one rounded edge 1210 is involved, which results in a more even flow.

LIST OF REFERENCE NUMERALS 110 flow pipe
112 fluid
114 flow velocity
116 first ultrasonic transducer
118 second ultrasonic transducer
120 propagation velocity of the ultrasonic transducer
122 protrusion
210 main flow direction
212 turbulators
410 eddy zone
412 burble zones
510 longitudinal eddies
512 flow line
910 ultrasonic flow meter
912 ultrasonic waves
914 reflection surface
916 insertion sensor
918 space for electronic terminal device
920 reflection element
922 bracket
924 wall film
1010 flow grooves
1210 rounded edge

What is claimed is:

1. An ultrasonic flow meter for measuring a flow velocity of a fluid flowing in an essentially laminar flow in a main flow direction, comprising:
at least two ultrasonic transducers capable of at least one of emitting and receiving an ultrasonic waves at an angle a to the main flow direction that is different from 90°; and
at least one turbulator situated upstream from at least one of the at least two ultrasonic transducers in the main flow direction of the fluid, the at least one turbulator generating longitudinal eddies in at least one zone adjacent to the at least one of the at least two ultrasonic transducers, wherein:
the at least one zone of the fluid in which the at least one turbulator generates the longitudinal eddies includes one of at least one protrusion of a flow pipe and a portion thereof;
an inner surface of the flow pipe is essentially smooth and uninterrupted with the exception of the at least one protrusion and the at least one turbulator; and
a length dimension of the at least one turbulator runs along a leading edge of the at least one protrusion.

2. The ultrasonic flow meter as recited in claim 1, wherein the at least one protrusion includes a rounded edge.

3. The ultrasonic flow meter as recited in claim 1, wherein the at least one turbulator is wedge-shaped.

4. The ultrasonic flow meter as recited in claim 1, wherein the at least one turbulator includes at least one flow groove.

5. The ultrasonic flow meter as recited in claim 4, wherein the at least one flow groove includes a wedge-shaped cross section.

6. The ultrasonic flow meter as recited in claim 1, wherein the at least one turbulator includes a periodic structure perpendicular to the main flow direction of the fluid.

7. The ultrasonic flow meter as recited in claim 1, wherein an at least one additional turbulator is situated downstream from the at least one of the at least two ultrasonic transducers with respect to the main flow direction of the fluid.

8. The ultrasonic flow meter as recited in claim 1, further comprising:
at least one electronic terminal device; and
an insertion sensor insertable into the flowpipe, wherein the at least two ultrasonic transducers and the at least one electronic terminal device are integrated in the insertion sensor.

9. The ultrasonic flow meter as recited in claim 8, further comprising:
at least one additional electronic control device for at least one of activating and reading at least one of the at least one of the at least two ultrasonic transducer and the at least one turbulator, the at least one additional electronic control device being integrated into the insertion sensor.

10. The ultrasonic flow meter as recited in claim 8, further comprising:
at least one reflection element including at least one reflection surface and being integrated into the insertion sensor, wherein:
the flow pipe includes at least one pipe wall, and
the at least one reflection element being located at a distance from the pipe wall in such a way that the fluid can flow along both sides of the at least one reflection surface on the at least one reflection element.

* * * * *